United States Patent
Nagata et al.

(10) Patent No.: US 11,260,822 B2
(45) Date of Patent: Mar. 1, 2022

(54) SIDE AIRBAG DEVICE

(71) Applicant: TOYODA GOSEI CO., LTD., Kiyosu (JP)

(72) Inventors: Matsuo Nagata, Kiyosu (JP); Tatsuya Hashido, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/934,250

(22) Filed: Jul. 21, 2020

(65) Prior Publication Data
US 2021/0061212 A1   Mar. 4, 2021

(30) Foreign Application Priority Data

Aug. 26, 2019  (JP) .............................. JP2019-153679

(51) Int. Cl.
*B60R 21/215* (2011.01)
*B60R 21/017* (2006.01)
*B60R 21/237* (2006.01)
*B60R 21/231* (2011.01)

(52) U.S. Cl.
CPC .......... *B60R 21/215* (2013.01); *B60R 21/017* (2013.01); *B60R 21/237* (2013.01); *B60R 21/23138* (2013.01)

(58) Field of Classification Search
CPC ... B60R 21/215; B60R 21/017; B60R 21/237; B60R 21/23138
See application file for complete search history.

(56) References Cited

U.S. PATENT DOCUMENTS

| | | | | |
|---|---|---|---|---|
| 5,257,815 A | * | 11/1993 | Bachelder | B60R 21/2171 280/728.2 |
| 5,458,362 A | * | 10/1995 | Buchanan | B60R 21/2171 280/728.2 |
| 5,501,484 A | * | 3/1996 | Saderholm | B60R 21/217 280/728.2 |
| 5,533,750 A | * | 7/1996 | Karlow | B60R 21/201 280/728.2 |
| 5,556,127 A | * | 9/1996 | Hurford | B60R 21/201 280/728.2 |
| 5,564,735 A | * | 10/1996 | Boy | B60R 21/21 280/730.2 |

(Continued)

FOREIGN PATENT DOCUMENTS

| | | |
|---|---|---|
| JP | 2004-291887 A | 10/2004 |
| JP | 2013-121758 A | 6/2013 |

*Primary Examiner* — Paul N Dickson
*Assistant Examiner* — Timothy Wilhelm
(74) *Attorney, Agent, or Firm* — Posz Law Group, PLC

(57) ABSTRACT

A side airbag device includes: a side airbag in a folded state; a gas generator that includes an attachment portion to be attached to a vehicle, and that is configured to generate inflation gas to be supplied to the side airbag; a wrapping sheet that covers peripheries of the side airbag and the gas generator, and that is breakable when the side airbag is deployed and inflated; and a wire harness that includes a connection end portion electrically connected to the gas generator, and that is led out to an outer portion of the wrapping sheet. The wire harness is provided with a first locking portion, and the wrapping sheet is provided with a second locking portion that is locked to the first locking portion.

2 Claims, 3 Drawing Sheets

(56) References Cited

U.S. PATENT DOCUMENTS

| | | | | |
|---|---|---|---|---|
| 5,601,332 A * | 2/1997 | Schultz | ............... | B60N 2/4235 |
| | | | | 297/216.13 |
| 5,667,241 A * | 9/1997 | Bunker | ............... | B60R 21/201 |
| | | | | 280/730.2 |
| 5,687,987 A * | 11/1997 | Spencer | ............... | B60R 21/207 |
| | | | | 280/728.2 |
| 5,890,733 A * | 4/1999 | Dillon | ............... | B60R 21/207 |
| | | | | 280/730.2 |
| 5,911,434 A * | 6/1999 | Townsend | ............ | B60R 21/207 |
| | | | | 280/730.2 |
| 5,947,630 A * | 9/1999 | Dillon | ............... | F16B 21/086 |
| | | | | 403/393 |
| 5,967,546 A * | 10/1999 | Homier | ............... | B60N 2/5883 |
| | | | | 280/730.2 |
| 5,967,547 A * | 10/1999 | Narita | ............... | B60R 21/207 |
| | | | | 280/730.2 |
| 5,992,878 A * | 11/1999 | Narita | ............... | B60R 21/207 |
| | | | | 280/730.2 |
| 6,007,089 A * | 12/1999 | Gotz | ............... | B60R 21/21 |
| | | | | 280/728.3 |
| 6,092,832 A * | 7/2000 | Worrell | ............. | B60R 21/2035 |
| | | | | 280/728.2 |
| 6,126,192 A * | 10/2000 | Enders | ............... | B60R 21/2176 |
| | | | | 280/728.2 |
| 6,129,419 A * | 10/2000 | Neale | ............... | B60N 2/58 |
| | | | | 297/284.4 |
| 6,196,577 B1 * | 3/2001 | Aoki | ............... | B60R 21/207 |
| | | | | 280/730.1 |
| 6,237,936 B1 * | 5/2001 | Quade | ............... | B60R 21/207 |
| | | | | 280/728.2 |
| 6,402,240 B1 * | 6/2002 | Toba | ............... | B60N 2/002 |
| | | | | 297/217.3 |
| 6,439,597 B1 * | 8/2002 | Harada | ............... | B60R 21/207 |
| | | | | 280/728.2 |
| 6,457,741 B2 * | 10/2002 | Seki | ............... | B60R 21/207 |
| | | | | 280/730.2 |
| 6,578,911 B2 * | 6/2003 | Harada | ............... | B60N 2/5825 |
| | | | | 280/730.2 |
| 6,857,655 B2 * | 2/2005 | Muller | ............... | B60R 21/2155 |
| | | | | 280/728.3 |
| 6,976,700 B2 * | 12/2005 | McCann | ............ | B60R 21/2171 |
| | | | | 280/728.2 |
| 7,048,297 B2 * | 5/2006 | Schneider | ............ | B60R 21/217 |
| | | | | 280/728.2 |
| 7,204,510 B2 * | 4/2007 | Bossenmaier | ......... | B60R 21/20 |
| | | | | 280/730.2 |
| 7,216,934 B1 * | 5/2007 | Kobari | ............... | B60R 21/207 |
| | | | | 297/180.14 |
| 7,232,150 B2 * | 6/2007 | Nagayama | ............ | B60R 21/20 |
| | | | | 280/728.3 |
| 7,267,363 B2 * | 9/2007 | Tredez | ............... | B60R 21/207 |
| | | | | 280/730.2 |
| 7,370,879 B2 * | 5/2008 | Hotta | ............... | B60R 21/206 |
| | | | | 280/728.2 |
| 7,490,899 B2 * | 2/2009 | McMillen | ............ | B60N 2/665 |
| | | | | 297/284.1 |
| 7,530,595 B2 * | 5/2009 | Naruse | ............... | B60R 21/21 |
| | | | | 280/728.2 |
| 7,604,250 B2 * | 10/2009 | Hotta | ............... | B60R 21/206 |
| | | | | 280/728.2 |
| 7,654,555 B2 * | 2/2010 | Schaupp | ............ | B60R 21/2171 |
| | | | | 280/728.2 |
| 7,654,556 B2 * | 2/2010 | Vigeant | ............... | B60R 21/201 |
| | | | | 280/728.2 |
| 7,661,697 B2 * | 2/2010 | Itoga | ............... | B60R 21/2171 |
| | | | | 280/728.2 |
| 7,669,888 B2 * | 3/2010 | Sato | ............... | B60R 21/23138 |
| | | | | 280/730.2 |
| 7,677,594 B2 * | 3/2010 | Hazlewood | ......... | B60N 2/5883 |
| | | | | 280/728.2 |
| 7,699,340 B2 * | 4/2010 | Okuhara | ............ | B60R 21/2171 |
| | | | | 280/728.2 |
| 7,753,407 B2 * | 7/2010 | Yokota | ............... | B60R 21/20 |
| | | | | 280/743.2 |
| 7,798,519 B2 * | 9/2010 | Kawabe | ............... | B60R 21/207 |
| | | | | 280/728.3 |
| 7,850,196 B2 * | 12/2010 | Kashiwagi | ............ | B60R 21/233 |
| | | | | 280/728.2 |
| 7,862,078 B2 * | 1/2011 | Yokota | ............... | B60R 21/2171 |
| | | | | 280/728.2 |
| 7,905,307 B2 * | 3/2011 | Kubota | ............ | H01M 10/6556 |
| | | | | 180/68.1 |
| 7,938,436 B2 * | 5/2011 | Lunt | ............... | B60R 21/2171 |
| | | | | 280/728.2 |
| 8,123,246 B2 * | 2/2012 | Gilbert | ............... | B60R 21/217 |
| | | | | 280/728.2 |
| 8,146,942 B2 * | 4/2012 | Bruning | ............... | B60R 21/205 |
| | | | | 280/728.2 |
| 8,172,257 B2 * | 5/2012 | Wandtke | ............... | B60R 21/21 |
| | | | | 280/728.2 |
| 8,196,954 B2 * | 6/2012 | Choi | ............... | B60R 21/2176 |
| | | | | 280/728.3 |
| 8,226,113 B2 * | 7/2012 | Yamashita | .......... | B60R 21/2171 |
| | | | | 280/730.2 |
| 8,316,516 B2 * | 11/2012 | Hoehe | ............... | A44B 18/0007 |
| | | | | 24/452 |
| 8,454,050 B2 * | 6/2013 | Schorle | ............... | B60R 21/217 |
| | | | | 280/728.2 |
| 8,469,392 B2 * | 6/2013 | Shankar | ............... | B60R 21/207 |
| | | | | 280/728.3 |
| 8,528,934 B2 * | 9/2013 | Kobayshi | ............. | B60R 21/207 |
| | | | | 280/740 |
| 8,534,701 B2 * | 9/2013 | Sosnowski | ............. | B60N 2/289 |
| | | | | 280/730.2 |
| 8,596,674 B2 * | 12/2013 | Fukawatase | ......... | B60N 2/99 |
| | | | | 280/730.2 |
| 8,622,422 B1 * | 1/2014 | Thomas | ............... | B60R 21/261 |
| | | | | 280/730.2 |
| 8,628,111 B2 * | 1/2014 | Sugimoto | ............. | B60R 21/233 |
| | | | | 280/729 |
| 8,651,518 B2 * | 2/2014 | Shamoto | ............... | B60N 2/5825 |
| | | | | 280/730.2 |
| 8,662,531 B2 * | 3/2014 | Tracht | ............... | B60R 21/2165 |
| | | | | 280/730.2 |
| 8,684,399 B2 * | 4/2014 | Honda | ............... | B60R 21/2171 |
| | | | | 280/728.2 |
| 8,733,832 B2 * | 5/2014 | Fukawatase | ......... | B60N 2/4235 |
| | | | | 297/216.1 |
| 8,746,732 B1 * | 6/2014 | Kutchey | ............... | B60R 21/2171 |
| | | | | 280/728.2 |
| 8,752,861 B2 * | 6/2014 | Fukawatase | .......... | B60R 21/207 |
| | | | | 280/728.2 |
| 8,764,049 B2 * | 7/2014 | Lusk | ............... | B60R 21/207 |
| | | | | 280/728.2 |
| 8,807,591 B2 * | 8/2014 | Nakata | ............... | D05B 23/00 |
| | | | | 280/728.3 |
| 8,955,877 B2 * | 2/2015 | Broussard | ............ | B60R 21/206 |
| | | | | 280/732 |
| 8,986,046 B2 * | 3/2015 | Smith | ............... | B60R 21/017 |
| | | | | 439/620.22 |
| 8,998,248 B2 * | 4/2015 | Shankar | ............ | B60N 2/42763 |
| | | | | 280/728.2 |
| 9,022,415 B2 * | 5/2015 | Kim | ............... | B60R 21/213 |
| | | | | 280/728.1 |
| 9,278,662 B2 * | 3/2016 | Hotta | ............... | B60R 21/207 |
| 9,296,352 B2 * | 3/2016 | Fujiwara | ............ | B60R 21/2171 |
| 9,346,432 B2 * | 5/2016 | Sugimoto | ............... | B60R 21/36 |
| 9,415,739 B2 * | 8/2016 | Mihm | ............... | B60N 2/90 |
| 9,463,768 B2 * | 10/2016 | Tanabe | ................ | B60R 21/215 |
| 9,469,258 B1 * | 10/2016 | Rickenbach | .......... | B60R 21/217 |
| 9,539,975 B2 * | 1/2017 | Tanabe | ............... | B60R 21/207 |
| 9,545,891 B2 * | 1/2017 | Tanabe | ............... | B60R 21/207 |
| 9,598,040 B2 * | 3/2017 | Tanabe | ............... | B60N 2/5825 |
| 9,616,791 B2 * | 4/2017 | Awata | ............... | B60N 2/986 |
| 9,630,584 B2 * | 4/2017 | Fujiwara | ............ | B60R 21/2171 |
| 9,688,230 B2 * | 6/2017 | Makita | ............... | B60R 21/207 |
| 9,896,053 B2 * | 2/2018 | Tanabe | ............... | B60N 2/986 |
| 10,005,418 B2 * | 6/2018 | Ito | ............... | B60N 2/986 |

(56) References Cited

U.S. PATENT DOCUMENTS

| | | | |
|---|---|---|---|
| 10,059,297 B2* | 8/2018 | Tanabe | B60R 21/2334 |
| 10,272,870 B2* | 4/2019 | Festag | B60R 13/0237 |
| 10,384,634 B2* | 8/2019 | Wiscombe | B60R 21/2176 |
| 10,399,533 B2* | 9/2019 | Yoshikai | B60N 2/5883 |
| 10,730,471 B2* | 8/2020 | Nakano | B60R 21/264 |
| 10,737,654 B2* | 8/2020 | Ono | B60R 21/217 |
| 10,773,673 B2* | 9/2020 | Bachmann | B60R 16/027 |
| 10,800,369 B2* | 10/2020 | Hioda | B60R 21/26 |
| 10,864,880 B2* | 12/2020 | Ross | B60R 21/206 |
| 10,994,686 B2* | 5/2021 | Inoue | B60R 21/215 |
| 2002/0084630 A1* | 7/2002 | Aulbach | B60R 21/207 280/728.2 |
| 2004/0239080 A1* | 12/2004 | Berrahou | B60R 21/203 280/728.2 |
| 2005/0029784 A1* | 2/2005 | Siegel | B60R 21/26 280/736 |
| 2005/0161927 A1* | 7/2005 | Yokoyama | B60R 21/23138 280/743.1 |
| 2006/0006630 A1* | 1/2006 | Schwarz | B60R 21/2171 280/728.2 |
| 2006/0061073 A1* | 3/2006 | Naruse | B60R 21/21 280/730.2 |
| 2007/0182131 A1* | 8/2007 | Helbig | B60R 21/2171 280/728.2 |
| 2008/0007035 A1* | 1/2008 | Acker | B60R 21/261 280/742 |
| 2008/0084051 A1* | 4/2008 | Okuhara | B60R 21/2171 280/728.2 |
| 2009/0039627 A1* | 2/2009 | Yokota | B60R 21/2346 280/730.2 |
| 2009/0152838 A1* | 6/2009 | Robins | B60R 21/2171 280/728.2 |
| 2010/0181746 A1* | 7/2010 | Rose | B60R 21/2171 280/736 |
| 2010/0253050 A1* | 10/2010 | Mitsuo | B60R 21/206 280/730.1 |
| 2014/0197621 A1* | 7/2014 | Thomas | B60R 21/207 280/730.2 |
| 2015/0061266 A1* | 3/2015 | Jordan | B60R 21/21 280/728.3 |
| 2015/0076802 A1* | 3/2015 | Tanabe | B60R 21/207 280/730.2 |
| 2015/0151711 A1* | 6/2015 | Fujiwara | B60R 21/2342 280/728.2 |
| 2015/0266445 A1* | 9/2015 | Kojima | B60R 21/2171 280/728.2 |
| 2015/0367805 A1* | 12/2015 | Santi | B60R 21/207 280/728.3 |
| 2016/0009247 A1* | 1/2016 | Fujiwara | B60R 21/2171 280/728.2 |
| 2016/0009248 A1* | 1/2016 | Tanabe | B60R 21/276 280/728.2 |
| 2016/0244018 A1* | 8/2016 | Zimmermann | B60N 2/58 |
| 2016/0288838 A1* | 10/2016 | Kindaichi | B60N 2/4235 |
| 2016/0325646 A1* | 11/2016 | Tanabe | B60R 21/207 |
| 2017/0066402 A1* | 3/2017 | Fujiwara | B60R 21/217 |
| 2018/0022304 A1* | 1/2018 | Yoshikai | B60R 21/207 280/728.3 |
| 2018/0118149 A1* | 5/2018 | Odai | B60R 21/206 |
| 2019/0202390 A1* | 7/2019 | Ono | B60R 21/217 |

\* cited by examiner

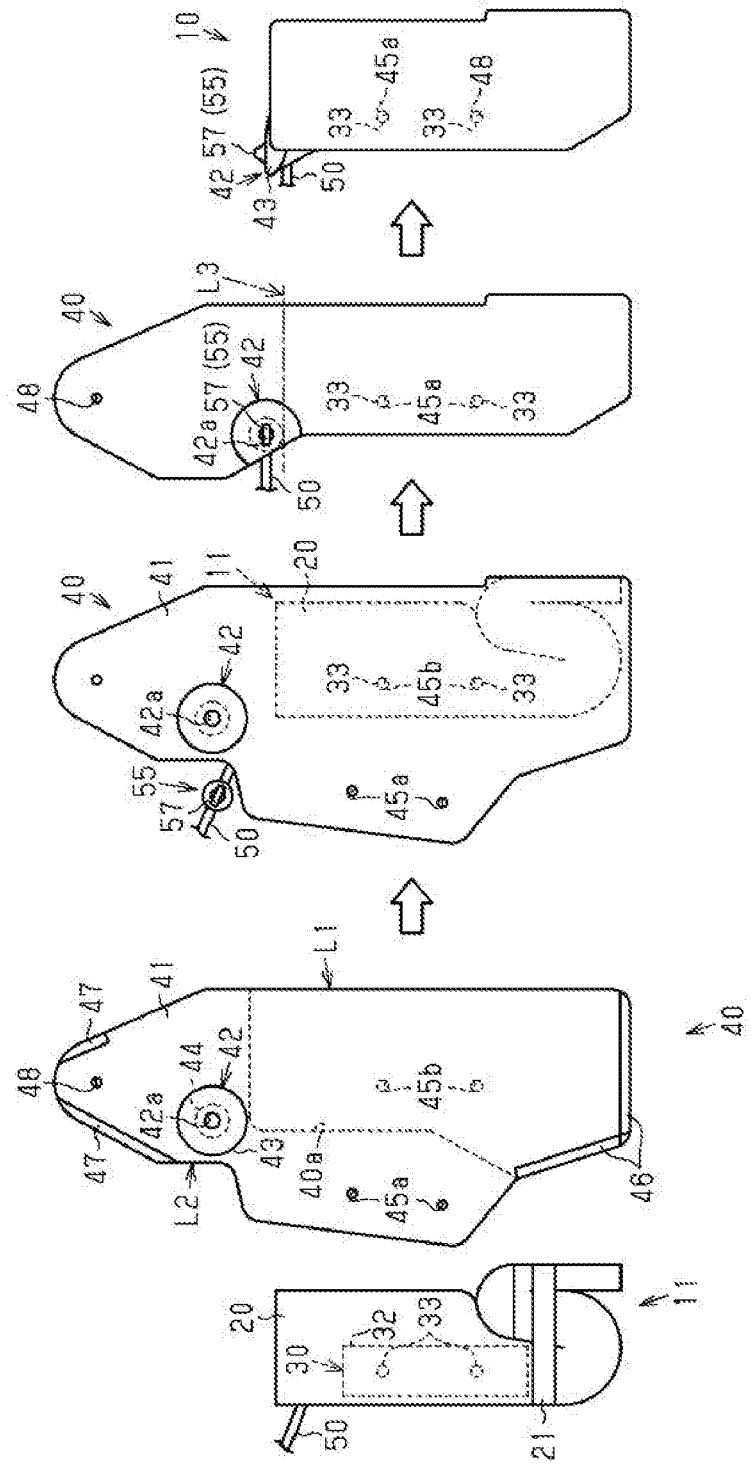

SIDE AIRBAG DEVICE

CROSS-REFERENCE TO RELATED APPLICATIONS

This application is based upon and claims the benefit of priority from prior Japanese patent application No. 2019-153679, filed on Aug. 26, 2019, the entire contents of which are incorporated herein by reference.

TECHNICAL FIELD

The present invention relates to a side airbag device.

BACKGROUND ART

A side airbag device is assembled to a vehicle (see, for example, JP-A-2004-291887). The side airbag device described in JP-A-2004-291887 includes an inflator attached to a side frame of a seat back, a side airbag deployed and inflated by gas generated by the inflator, and a wrapping sheet that covers the whole of the inflator and the side airbag in a folded state. The wrapping sheet has a bag-shaped vertically long sheet main body. A connection end portion of a wire harness is connected to an upper end portion of the inflator. In addition, the wrapping sheet includes a clamp piece that covers a portion of the wire harness that is led out to the outside of the sheet main body, and a caution label as a fastening means for attaching the clamp piece to a surface of the sheet main body. According to such a configuration, the portion of the wire harness that is led out to the outside of the sheet main body is held in a posture along a longitudinal direction of the sheet main body by the clamp piece.

However, in the related-art side airbag device including the one described in JP-A-2004-291887, there is a concern that an operator may erroneously grasp and handle the wire harness at the time of an assembly work to the vehicle. In this case, a large tensile load due to an own weight of the side airbag device easily acts on the connection end portion of the wire harness. In order to cope with such a problem, measures have been taken to increase tensile strength at the connection end portion of the wire harness. Therefore, there is a problem that a configuration of the connection end portion of the wire harness is complicated.

An object of the present invention is to provide a side airbag device capable of suppressing a large tensile load from acting on a connection end portion of a wire harness while suppressing a configuration of the connection end portion of the wire harness from being complicated.

SUMMARY OF INVENTION

According to an aspect of the invention, there is provided a side airbag device comprising: a side airbag in a folded state; a gas generator that includes an attachment portion to be attached to a vehicle, and that is configured to generate inflation gas to be supplied to the side airbag; a wrapping sheet that covers peripheries of the side airbag and the gas generator, and that is breakable when the side airbag is deployed and inflated; and a wire harness that includes a connection end portion electrically connected to the gas generator, and that is led out to an outer portion of the wrapping sheet, wherein the wire harness is provided with a first locking portion, and the wrapping sheet is provided with a second locking portion that is locked to the first locking portion.

BRIEF DESCRIPTION OF DRAWINGS

FIGS. 3A to 3D are explanatory views sequentially showing manufacturing steps of the side airbag device according to the embodiment.

DESCRIPTION OF EMBODIMENTS

Hereinafter, an embodiment of a side airbag device will be described with reference to FIGS. 1 to 3D.

Figure 1:
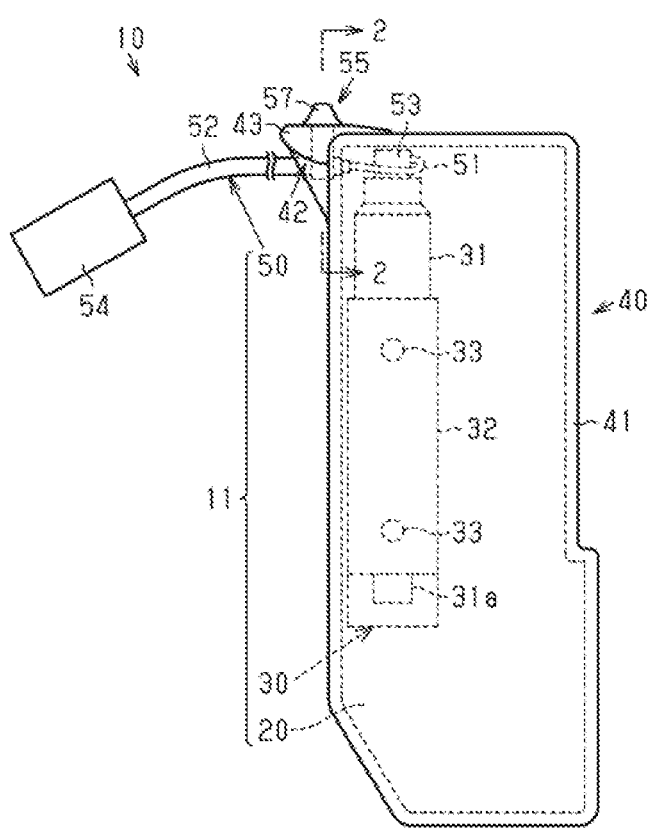
FIG. 1 is a side view showing a side airbag device according to an embodiment.

As shown in FIG. 1, a side airbag device 10 is attached to a side frame of a seat back of a front seat of an automobile, and includes a side airbag 20 in a folded state and a gas generator 30 for generating inflation gas to be supplied to the side airbag 20. In addition, the side airbag device 10 includes a wrapping sheet 40 that covers peripheries of the side airbag 20 and the gas generator 30 and is breakable when the side airbag 20 is deployed and inflated, and a wire harness 50 that is electrically connected to the gas generator 30.

<Side Airbag 20>

The side airbag 20 is formed by folding one piece of cloth in two along a folding line set in a central portion thereof and overlapping them, and joining the overlapped portions in a bag shape. As the cloth piece described above, a material that has high strength and flexibility and can be easily folded, for example, a woven fabric formed using a polyester yarn, a polyamide yarn, or the like is suitable.

<Gas Generator 30>

The gas generator 30 has a long tubular shape, and includes an inflator 31 that supplies the inflation gas, and a retainer 32 that covers the inflator 31 and functions as a diffuser for controlling a direction in which the gas is ejected. Hereinafter, an axis direction of the inflator 31 may be simply referred to as the axis direction, and a radial direction of the inflator 31 may be simply referred to as the radial direction. A pair of bolts 33 protruding radially outward are fixed to the retainer 32 at intervals in the axis direction. These bolts 33 function as attachment portions according to the present invention.

<Wire Harness 50>

Figure 2:
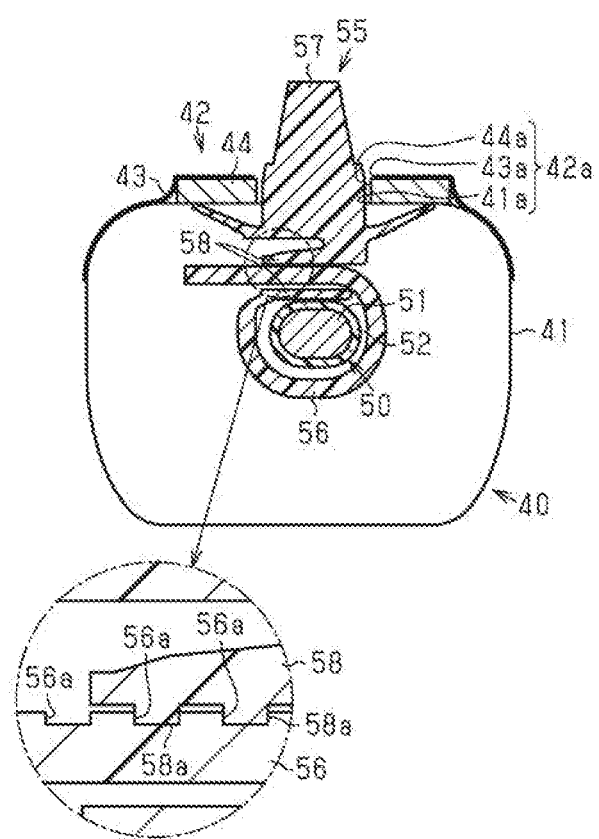
FIG. 2 is a sectional view taken along a line 2-2 of FIG. 1.

As shown in FIG. 2, the wire harness 50 includes an electric wire 51 and a covering member 52 that covers the electric wire 51.

As shown in FIG. 1, a first connector 53 and a second connector 54 are respectively connected to a first end of the wire harness 50 and a second end thereof opposite to the first end.

The first connector 53 is connected to another end of the inflator 31 opposite to one end provided with a gas ejection port 31a. The first connector 53 corresponds to a connection end portion according to the present invention.

The second connector 54 is connected to a control device (not shown) for outputting an operation signal to the inflator 31.

As shown in FIGS. 1 and 2, a first locking portion 55 is provided in a portion of the wire harness 50 between the first connector 53 and the second connector 54.

As shown in FIG. 2, the first locking portion 55 is a band clip made of resin. The first locking portion 55 includes a band portion 56 fastened to an outer periphery of the covering member 52, a locking protrusion 57 projecting from an outer surface of the band portion 56, and an annular portion 58 through which the band portion 56 is inserted and which can adjust a degree of fastening by the band portion 56. As shown in an enlarged view in FIG. 2, a plurality of grooves 56*a* are formed in the band portion 56 at intervals in a length direction of the band portion 56. The annular portion 58 is provided with claws 58*a* lockable to a portion of the plurality of grooves 56*a* of the band portion 56.

<Airbag Assembly 11>

As shown in FIG. 3A, the side airbag 20 is folded in a state in which the gas generator 30 is disposed therein. A belt-shaped member 21 for preventing the side airbag 20 from being collapsed is wound around an outer periphery of the side airbag 20 in the folded state.

The side airbag 20, the gas generator 30, the wire harness 50, and the belt-shaped member 21 form an airbag assembly 11.

<Wrapping Sheet 40>

As shown in FIG. 3A, the wrapping sheet 40 accommodates the airbag assembly 11 and has a long bag shape. The wrapping sheet 40 is formed by folding one nonwoven fabric at folding lines L1, L2. Such a nonwoven fabric is formed of a thermoplastic resin fiber such as polypropylene or polyethylene terephthalate and a binder fiber made of a thermoplastic resin having a melting point lower than that of the same fiber. A plurality of welding portions 46, 47 thermally welded to each other by melting the binder fibers of the nonwoven fabric overlapped with each other are provided on a peripheral edge portion of the wrapping sheet 40. The wrapping sheet 40 is formed with perforations (not shown) that extend along the folding line L1 and are broken by the side airbag 20 that is deployed and inflated. An opening portion 40*a* communicating the inside and outside of the wrapping sheet 40 is formed in a portion of the peripheral edge portion of the wrapping sheet 40 opposite to the folding line L1 described above.

As shown in FIG. 3B, the airbag assembly 11 is accommodated in the wrapping sheet 40 through the opening portion 40*a* described above. At this time, an axis direction of the airbag assembly 11 substantially coincides with a longitudinal direction of the wrapping sheet 40. In this state, a portion of the wire harness 50 on a second connector 54 side is led out to an outer portion of the wrapping sheet 40 through the opening portion 40*a* described above.

As shown in FIG. 3B, a second locking portion 42 to which the first locking portion 55 of the wire harness 50 is locked is provided in a portion of the wrapping sheet 40 in a vicinity of the opening portion 40*a* and in a vicinity of the wire harness 50.

As shown in FIGS. 2 and 3, the second locking portion 42 includes an insertion hole 41*a* provided in the wrapping sheet 40, a center hole 43*a* of an annular sheet member 43 fixed in a state of being overlapped on an outer surface of the wrapping sheet 40, and a center hole 44*a* of an annular metal plate member 44 provided between the wrapping sheet 40 and the sheet member 43. The metal plate member 44 has an outer diameter smaller than an outer diameter of the sheet member 43. The wrapping sheet 40, the metal plate member 44, and the sheet member 43 are provided so that the insertion hole 41*a* and the center holes 44*a*, 43*a* are positioned on the same axis, and an outer peripheral portion of the sheet member 43 is adhered to the outer surface of the wrapping sheet 40. The sheet member 43 is formed of a nonwoven fabric having a larger basis weight and higher strength than that of the nonwoven fabric forming the sheet main body 41. The metal plate member 44 is a washer formed of iron, for example. The sheet member 43 and the metal plate member 44 described above correspond to a first sheet member and a second sheet member according to the present invention.

As shown in FIG. 2, a locking hole 42*a* into which the locking protrusion 57 of the first locking portion 55 is inserted is formed by the insertion hole 41*a* and the center holes 44*a*, 43*a* described above.

Note that the sheet main body 41 is provided with five convenient holes 45*a*, 45*b*, 48 for inserting the pair of bolts 33 (see FIGS. 3A and 3B).

Next, a manufacturing procedure of the side airbag device 10 will be described.

As shown in FIGS. 3A and 3B, the airbag assembly 11 is accommodated in the wrapping sheet 40 through the opening portion 40*a*. At this time, the pair of bolts 33 of the retainer 32 is inserted into the pair of holes 45*b* of the wrapping sheet 40. In addition, the portion of the wire harness 50 on the second connector 54 side is led out to the outside of the wrapping sheet 40.

Next, as shown in FIG. 3C, the locking protrusion 57 of the first locking portion 55 is elastically deformed, and is inserted into the locking hole 42*a* of the second locking portion 42. At this time, the locking protrusion 57 is locked to a peripheral edge portion of the locking hole 42*a* by protruding outward from the outer diameter of the locking hole 42*a*.

Further, by folding back a side portion of the wrapping sheet 40, the pair of bolts 33 are inserted into the pair of holes 45*a* provided on the same side portion.

Next, as shown in FIGS. 3C and 3D, by folding back a side portion of the wrapping sheet 40 along a folding line U, one of the bolts 33 is inserted into the hole 48 provided on the same side portion.

In a vehicle on which the side airbag device 10 is mounted, when an impact greater than or equal to a threshold value is applied to the vehicle due to a side collision of the vehicle or the like, and the impact is detected by an impact sensor (not shown) provided on the vehicle, an operation signal for operating the gas generator 30 is output from the control device described above to the gas generator 30 based on a detection signal. In response to the operation signal, the inflation gas is ejected from the inflator 31 into the side airbag 20. Due to the gas thus ejected, an internal pressure of the side airbag 20 increases, and the perforations described above provided on the wrapping sheet 40 is broken, and the side airbag 20 is deployed and inflated between the occupant and a side door.

Next, operation and effects of the present embodiment will be described.

(1) The side airbag device 10 includes the side airbag 20 in the folded state, the gas generator 30, the wrapping sheet 40 that covers the peripheries of the side airbag 20 and the gas generator 30 and is breakable when the side airbag 20 is deployed and inflated, and the wire harness 50. The gas generator 30 includes the bolt 33 attached to the vehicle, and generates the inflation gas to be supplied to the side airbag 20. The wire harness 50 includes the first connector 53 electrically connected to the gas generator 30, and is led out to the outer portion of the wrapping sheet 40. The wire harness 50 is provided with the first locking portion 55. The wrapping sheet 40 is provided with the second locking portion 42 that is locked to the first locking portion 55.

According to such a configuration, the first locking portion 55 provided on the wire harness 50 and the second locking portion 42 provided on the wrapping sheet 40 are locked to each other, so that a displacement of the portion of the wire harness 50 closer to the first connector 53 side of the gas generator 30 than the locking portions 42, 55 with respect to the wrapping sheet 40 is restricted. Therefore, for example, even when a worker mistakenly grasps and handles the wire harness 50 at the time of an assembly work to the vehicle, it is possible to suppress a large tensile load due to the own weight of the side airbag device 10 from acting on the first connector 53 of the wire harness 50. Therefore, it is possible to suppress the large tensile load from acting on the connection end portion of the wire harness while suppressing a configuration of the connection end portion of the wire harness 50 from being complicated.

(2) The first locking portion 55 includes the locking protrusion 57. The second locking portion 42 includes the locking hole 42a into which the locking protrusion 57 is inserted. The first locking portion 55 and the second locking portion 42 are locked to each other by inserting the locking protrusion 57 into the locking hole 42a.

According to such a configuration, the first locking portion 55 and the second locking portion 42 can be easily locked to each other by inserting the locking protrusion 57 of the first locking portion 55 into the locking hole 42a of the second locking portion 42.

(3) The sheet member 43 is fixed to the wrapping sheet 40 in an overlapping state. The locking hole 42a is provided so as to penetrate the wrapping sheet 40 and the sheet member 43.

According to such a configuration, rigidity of the peripheral edge portion of the locking hole 42a of the wrapping sheet 40 is increased by the sheet member 43 fixed in a state of being overlapped with the wrapping sheet 40. Therefore, the strength of the second locking portion 42 can be increased.

(4) The sheet member 43 is adhered to the wrapping sheet 40.

According to such a configuration, the sheet member 43 can be easily fixed to the wrapping sheet 40.

(5) The metal plate member 44 is provided between the wrapping sheet 40 and the sheet member 43 in a state of being overlapped with the wrapping sheet 40 and the sheet member 43. The locking hole 42a is provided so as to penetrate the wrapping sheet 40, the metal plate member 44, and the sheet member 43.

According to such a configuration, the rigidity of the peripheral edge portion of the locking hole 42a is increased by the sheet member 43 fixed in a state of being overlapped with the wrapping sheet 40, and the metal plate member 44 provided between the wrapping sheet 40 and the sheet member 43. Therefore, the strength of the second locking portion 42 can be further increased.

<Modification>

The embodiment described above may be modified and implemented as follows, for example. The present embodiment and the following modifications can be implemented in combination with each other as long as they do not have technical contradiction.

For example, if the strength of the second locking portion 42 can be ensured by the flexible sheet member 43, the metal plate member 44 may be omitted.

The metal plate member 44 may be directly fixed to the wrapping sheet 40. In this case, the sheet member 43 can be omitted.

The sheet member 43 is not limited to a nonwoven fabric, and can be formed of another material having flexibility such as a woven fabric.

In the embodiment described above, a configuration in which the first locking portion 55 includes the locking protrusion 57 and the second locking portion 42 includes the locking hole 42a is illustrated. Conversely, the present invention can be embodied as a configuration in which the first locking portion includes a locking hole and the second locking portion includes a locking protrusion that is locked to the locking hole.

According to an aspect of the invention, there is provided a side airbag device comprising: a side airbag in a folded state; a gas generator that includes an attachment portion to be attached to a vehicle, and that is configured to generate inflation gas to be supplied to the side airbag; a wrapping sheet that covers peripheries of the side airbag and the gas generator, and that is breakable when the side airbag is deployed and inflated; and a wire harness that includes a connection end portion electrically connected to the gas generator, and that is led out to an outer portion of the wrapping sheet, wherein the wire harness is provided with a first locking portion, and the wrapping sheet is provided with a second locking portion that is locked to the first locking portion.

According to this configuration, the first locking portion provided on the wire harness and the second locking portion provided on the wrapping sheet are locked to each other, so that a displacement of a portion of the wire harness closer to the connection end portion side of the gas generator than the locking portions with respect to the wrapping sheet is restricted. Therefore, for example, even when a worker mistakenly grasps and handles the wire harness at the time of an assembly work to the vehicle, it is possible to suppress a large tensile load due to the own weight of the side airbag device from acting on the connection end portion of the wire harness. Therefore, it is possible to suppress the large tensile load from acting on the connection end portion of the wire harness while suppressing a configuration of the connection end portion of the wire harness from being complicated.

In the side airbag device described above, it is preferable that the first locking portion includes the locking protrusion, the second locking portion includes the locking hole into which the locking protrusion is inserted, and the first locking portion and the second locking portion are locked to each other by inserting the locking protrusion into the locking hole.

According to this configuration, the first locking portion and the second locking portion can be easily locked to each other by inserting the locking protrusion of the first locking portion into the locking hole of the second locking portion.

In the side airbag device described above, it is preferable that the flexible first sheet member is fixed to the wrapping sheet in the overlapping state, and the locking hole is provided so as to penetrate the wrapping sheet and the first sheet member.

According to this configuration, rigidity of the peripheral edge portion of the locking hole is increased by the first sheet member fixed in a state of being overlapped with the wrapping sheet. Therefore, strength of the second locking portion can be increased.

In the side airbag device described above, it is preferable that the sheet member is adhered to the wrapping sheet.

According to this configuration, the sheet member can be easily fixed to the wrapping sheet.

In the side airbag device described above, it is preferable that the second sheet member harder than the first sheet member is provided between the wrapping sheet and the first sheet member in the state of being overlapped with the wrapping sheet and the first sheet member, and the locking hole is provided so as to penetrate the wrapping sheet, the second sheet member, and the first sheet member.

According to this configuration, the rigidity of the peripheral edge portion of the locking hole is increased by the first sheet member fixed in the state of being overlapped with the wrapping sheet, and the second sheet member provided between the wrapping sheet and the first sheet member. Therefore, the strength of the second locking portion can be further increased.

According to the present invention, it is possible to suppress the large tensile load from acting on the connection end portion of the wire harness while suppressing the configuration of the connection end portion of the wire harness from being complicated.

The invention claimed is:

1. A side airbag device comprising:
a side airbag in a folded state;
a gas generator that includes an attachment portion to be attached to a vehicle, and that is configured to generate inflation gas to be supplied to the side airbag;
a wrapping sheet that covers peripheries of the side airbag and the gas generator, and that is breakable when the side airbag is deployed and inflated; and
a wire harness that includes a connection end portion electrically connected to the gas generator, and that is led out to an outer portion of the wrapping sheet, wherein
the wire harness is provided with a first locking portion, and
the wrapping sheet is provided with a second locking portion that is locked to the first locking portion, wherein
the first locking portion includes a locking protrusion,
the second locking portion includes a locking hole into which the locking protrusion is inserted, and
the first locking portion and the second locking portion are locked to each other by inserting the locking protrusion into the locking hole,
a flexible first sheet member is fixed to the wrapping sheet in an overlapping state, and
the locking hole is provided so as to penetrate the wrapping sheet and the first sheet member,
the first sheet member is adhered to the wrapping sheet,
a second sheet member harder than the first sheet member is provided between the wrapping sheet and the first sheet member in a state of being overlapped with the wrapping sheet and the first sheet member, and
the locking hole is provided so as to penetrate the wrapping sheet, the second sheet member, and the first sheet member.

2. The side airbag device according to claim 1, wherein the second sheet member comprises a metal plate member provided between the wrapping sheet and the first sheet member, and the locking hole penetrates, in this order, the first sheet member and the metal plate member.

* * * * *